United States Patent
Rau et al.

[11] Patent Number: 5,904,069
[45] Date of Patent: May 18, 1999

[54] GEAR-CHANGE SWITCH FOR CONTROLLING BICYCLE GEARS

[75] Inventors: Johannes Rau, Schweinfurt; Bernhard Johanni, Oberwerrn; Markus Arbeiter, Würzburg, all of Germany

[73] Assignee: Mannesmann Sachs AG, Schweinfurt, Germany

[21] Appl. No.: 09/018,059

[22] Filed: Feb. 3, 1998

[30] Foreign Application Priority Data

Feb. 4, 1997 [DE] Germany .......................... 197 03 931

[51] Int. Cl.⁶ .................................................. B60K 20/02
[52] U.S. Cl. ................................... 74/473.14; 74/473.13; 74/502.2; 74/489
[58] Field of Search ........................... 74/473.13, 473.14, 74/489, 502.2, 142

[56] References Cited

U.S. PATENT DOCUMENTS

| | | | |
|---|---|---|---|
| 4,155,270 | 5/1979 | Juy | 74/473.13 |
| 4,731,046 | 3/1988 | Juy | 74/502.2 |
| 5,315,891 | 5/1994 | Tagawa | 74/473.13 |
| 5,479,776 | 1/1996 | Romano | 74/473.13 |
| 5,577,413 | 11/1996 | Tagawa et al. | 74/473.14 |
| 5,609,064 | 3/1997 | Abe | 74/502.2 |
| 5,666,859 | 9/1997 | Arbeiter et al. | 74/502.2 |
| 5,673,594 | 10/1997 | Huang et al. | 74/473.13 |
| 5,682,794 | 11/1997 | Shibata | 74/473.14 |
| 5,732,598 | 3/1998 | Shoge et al. | 74/473.13 |

FOREIGN PATENT DOCUMENTS

| | | | |
|---|---|---|---|
| 2701917 | 9/1994 | France | 74/502.2 |
| 90 15 515 U | 5/1991 | Germany | B62M 25/04 |

*Primary Examiner*—John A. Jeffery
*Assistant Examiner*—Chong H. Kim
*Attorney, Agent, or Firm*—Cohen, Pontani, Lieberman & Pavane

[57] ABSTRACT

A gear-change switch, particularly a stepping switch for controlling gears on bicycles or similar vehicles, has a fixed housing and an actuating element rotatably mounted for rotation in the clockwise and counterclockwise directions to tension or release a traction cable for controlling the bicycle gears. The actuation element comprises a thumb-operated gear-change switch or a twist-grip gear-change switch. The advantage of the switching device lies in the considerable simplification of the design and in the production of the components in plastic material.

8 Claims, 3 Drawing Sheets

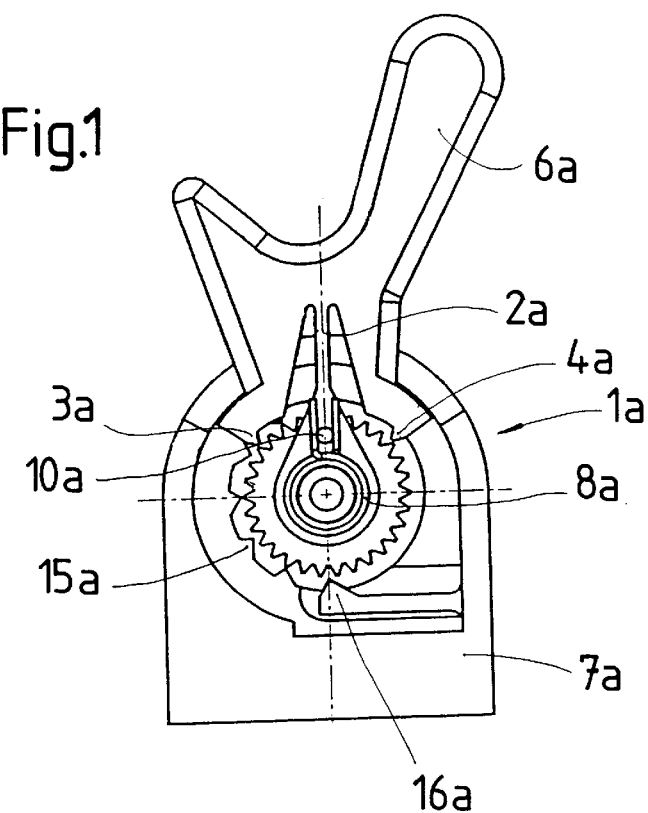
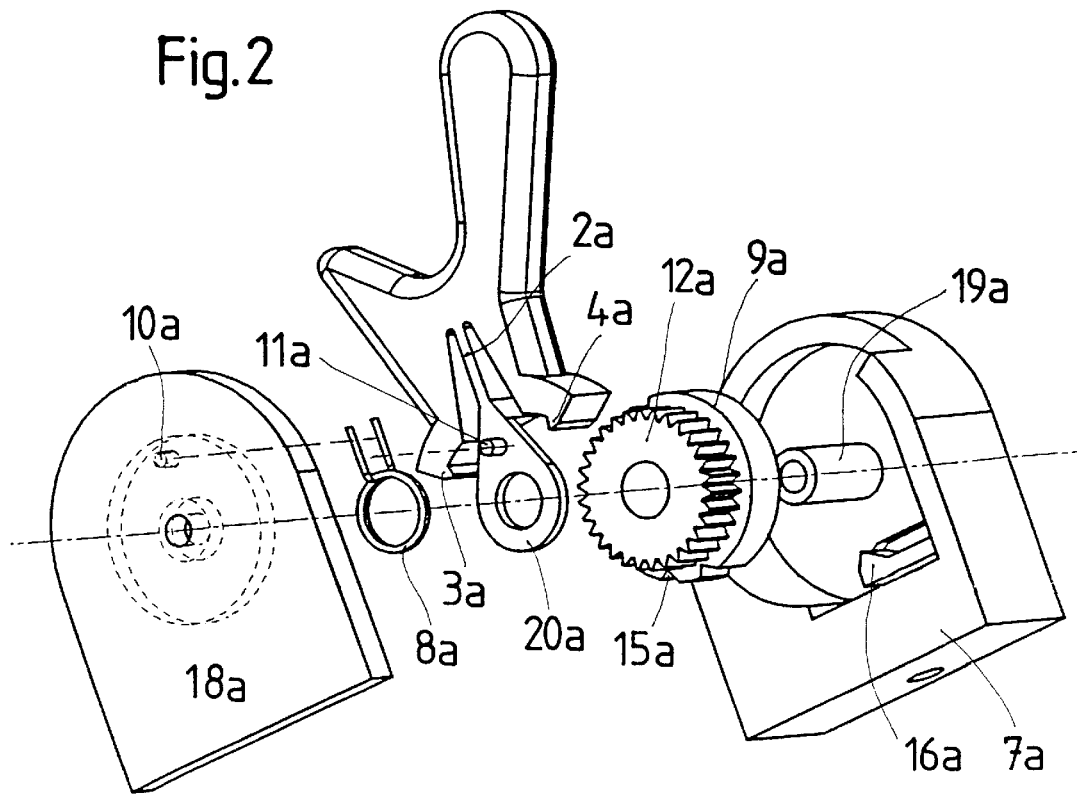

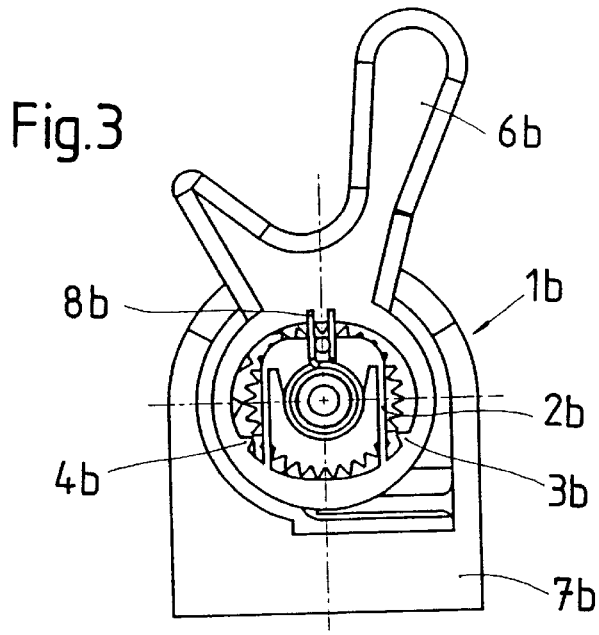
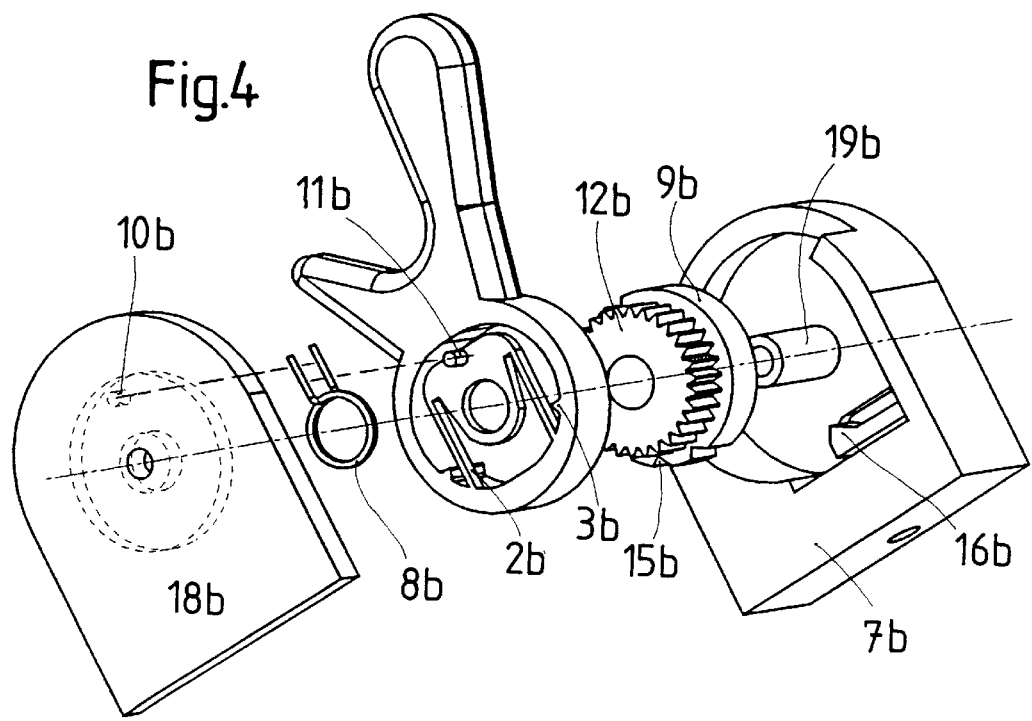

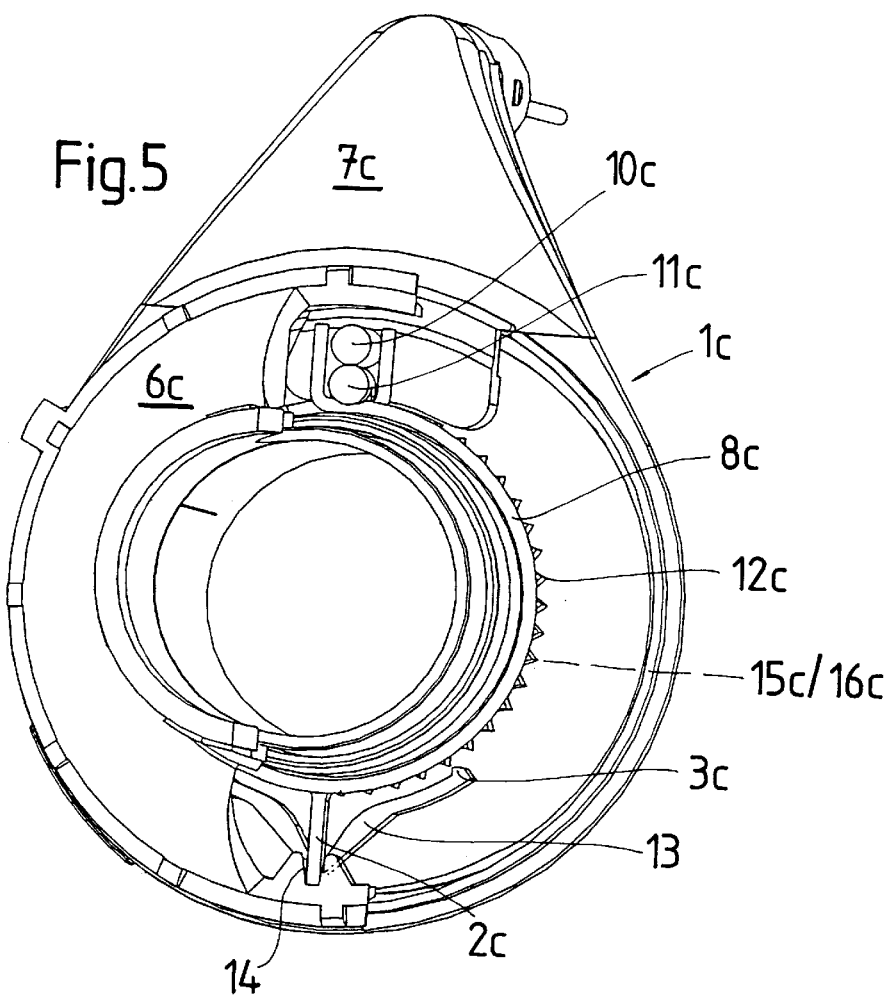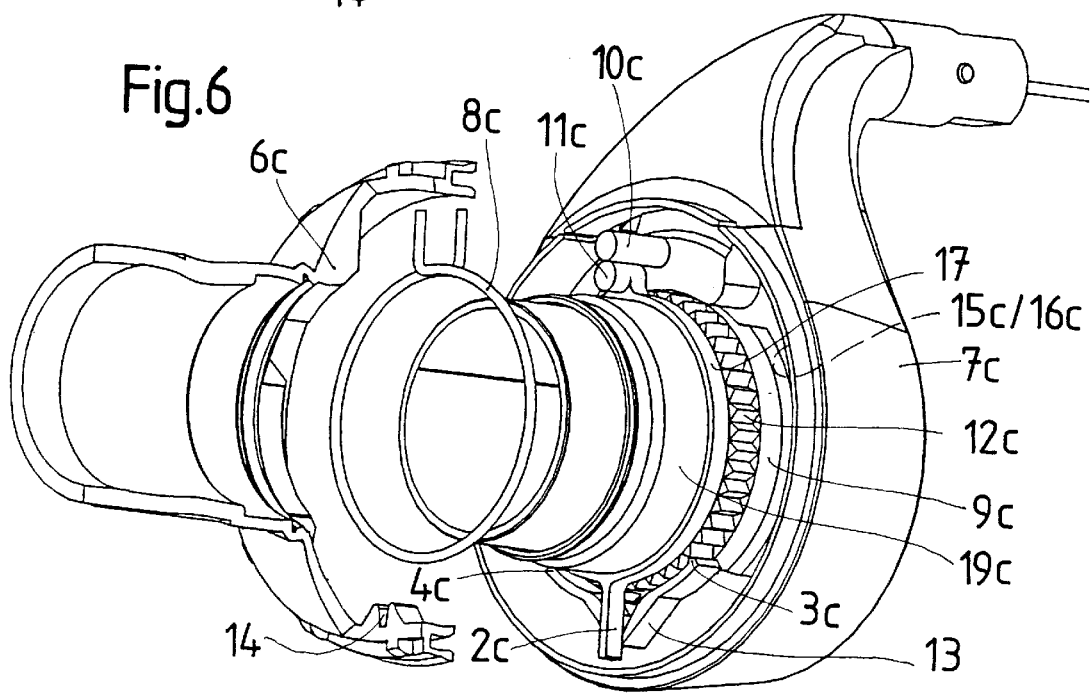

GEAR-CHANGE SWITCH FOR CONTROLLING BICYCLE GEARS

BACKGROUND OF THE INVENTION

1. Field of the Invention

The invention relates to a gear-change switch for controlling bicycle gears. More particularly, the invention relates to a stepping gear-change switch for switching up or down to a gear adjacent a present gear position by shifting the gearshift from a neutral position to a stop and releasing it, such that the gearshift returns to the neutral position and is ready for a subsequent gear change.

2. Description of the Related Art

A gear-change switch, in particular a stepping switch for controlling bicycle gears, has been disclosed by German Utility Model 90 15 515, in which it is possible, by actuating a single gearshift lever, to shift up or down to each gear adjacent to a present gear position, by shifting the gearshift lever in each case as far as the stop and then releasing it again, so that the gearshift lever moves back into its position of readiness.

SUMMARY OF THE INVENTION

It is an object of the present invention to provide a gear-change switch for controlling bicycle gears which can be produced inexpensively, can be used as a thumb-actuated gear-change switch and as a twist-grip gear-change switch and allows any desired number of steps in both actuation directions.

The gear-change switch of the present invention has the advantage over the prior art that it can be produced and mounted more inexpensively by injection molding from plastic material. Furthermore, the respective shifting step is not limited to one gear step, but rather it is possible for a plurality of gear steps to be arranged in any desired direction of actuating, an effect which can be achieved either by providing a limitation by means of stops or by limiting the travel on the leg spring. Finally, the principle can be used not only for frame-mounted gear-change switches but also for twist-grip gear-change switches, where the stepped shiftability can be achieved with only a slight additional outlay, namely by integrating a switching ring with the leg spring.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Three different exemplary embodiments of gear-change switches for controlling bicycle gears are explained with reference to drawings, in which:

FIG. 1 shows a plan view of a gear-change switch with an actuating element which is joined integrally to a pivot spring, an entraining pin and two entraining teeth, in a fixed housing;

FIG. 2 shows a perspective view of the gear-change switch of FIG. 1;

FIG. 3 shows a plan view of a gear-change switch similar to that shown in FIG. 1, but with a two-limbed pivot spring;

FIG. 4 shows a perspective view of the gear-change switch of FIG. 3;

FIG. 5 shows a side view of a gear-change switch with an actuating element, a pivot spring, an entraining pin and also entraining teeth, designed as a twist-grip gear-change switch; and FIG. 6 shows a perspective view of the twist-grip gear-change switch of FIG. 5.

DETAILED DESCRIPTION OF THE PRESENTLY PREFERRED EMBODIMENTS

Referring to FIGS. 1 and 2 a gear-change switch 1a for controlling bicycle gears includes a fixed housing 7a with a bearing location 19a and an integrally connected catch spring 16a. An actuating element 6a, which is arranged rotatably within the fixed housing 7a, integrally comprises an actuating portion 21a, which is movable by a user, a pivot spring 2a, an entraining pin 11a, and a first entraining tooth 3a and a second entraining tooth 4a. A leg spring 8a, which surrounds the entraining pin 11a by means of its two legs, is arranged around the bearing location 19a of the actuating element 6a in the fixed housing 7a.

At the same time, the two legs of the leg spring 8a surround a fixed pin 10a which is arranged on a housing cover 18a. The housing cover 18a is connected to the fixed housing 7a and, in conjunction with the latter, encloses the elements of the gear-change switch 1a. A bearing ring 20a which is rotatably mounted on the bearing location 19a and centers the actuating element 6a, is formed integrally on the pivot spring 2a. Also arranged on the bearing location 19a is a unit comprising a toothed wheel 12a connected to a winding wheel 9a. One of the entraining teeth 3a and 4a engages the teeth of the toothed wheel 12a when the actuating element 6a is rotated in the clockwise or counter-clockwise direction to one of the stops 22a on the fixed housing 7a which limits the rotation of actuating element 6a. The winding wheel 9a comprises catches 15a in which the above-mentioned catch spring 16a engages. Finally, the leg spring 8a is mounted on the bearing location 19a and holds the entraining pin 11a and the fixed pin 10a at a defined position under preloading by its two legs.

Referring to FIGS. 3 and 4, in another embodiment of the invention, a gear-change switch 1b for controlling bicycle gears comprises a fixed housing 7b with a bearing location 19b and a catch spring 16b integrally connected therein. An actuating element 6b, which is arranged rotatably in the fixed housing 7b, includes an actuating portion 21b, a pivot spring 2b, an entraining pin 10b, and a first entraining tooth 3b and a second entraining tooth 4b. A leg spring 8b, having two legs which surround the entraining pin 11b is arranged around the bearing location 19b of the actuating element 6b in the fixed housing 7b.

The leg spring 8b also surrounds, by means of its two legs, a fixed pin 10b which is arranged in a housing cover 18b. The housing cover 18b is connected to the fixed housing 7b and, in conjunction with the latter, encloses the above-mentioned elements of the gear-change switch 1b. A bearing ring 20b, which is mounted on the bearing location 19b and centers the actuating element 6b, is formed integrally on the pivot spring 2b. Also arranged on the bearing location 19b is a unit comprising a toothed wheel 12b and a winding wheel 9b. One of the entraining teeth 3b and 4b engages the teeth of the toothed wheel 12b when the actuating element 6b is rotated in the clockwise or counter-clockwise direction to one of the stops 22a on the fixed housing 2a which limits the rotation of the actuation element 6a. The winding wheel 9b has catches 15b which engage the above-mentioned catch spring 16b. Finally, the leg spring 8b is mounted on the bearing location 19b and holds the entraining pin 11b and the fixed pin 10b at a defined position under preloading by its two legs.

FIG. 5 shows a gear-change switch 1c which is designed as a twist-grip gear-change switch and comprises a fixed housing 7c and an actuating element 6c. In this embodiment, an actuating portion 21c of the actuating element 6c is part of a grip, such as a handlebar grip which the rider of a bicycle holds while riding the bicycle.

FIG. 6 shows a perspective, exploded view of the gear-change switch 1c, thus making the arrangement of the parts more clearly discernible. The fixed housing 7c has a bearing location 19c, on which a unit comprising a winding wheel 9c connected to a toothed wheel 12c is rotatably arranged. If the unit is rotated, a traction cable (not shown) that is wound on the winding wheel 9c is tightened or released for controlling the bicycle gears. A switching ring 17 is also arranged on the bearing location 19c. The switching ring 17 is joined integrally to an entraining pin 11c, a pivot spring 2c and a latching bow 13 with a first entraining tooth 3c and a second entraining tooth 4c. Furthermore, the actuating element 6c comprises an entraining notch 14 which engages in the outer end of the pivot spring 2c and preloads the latter. In addition, actuating element 6c is centered on the bearing location 19c by the entraining notch 14. A leg spring 8c is arranged around the bearing location 19c, the legs of which clasp the entraining pin 11c and a fixed pin 10c which is connected to the fixed housing 7c so that the actuating element 6c is always rotated back into a starting position after the end of each switching operation. The winding wheel 9c is supported on the fixed housing 7c by a latching connection which is not shown here and comprises catches 15c and a catch spring 16c (such as catches 15a and 15b, and catch springs 16a and 16b shown in FIGS. 1–4), so that these also ensure that the individual latching steps in the shifting travel are observed when controlling the bicycle gears. The amount of rotation of actuating element 6c is limited by stops 22c (only one of which is shown in FIG. 6).

Referring now to FIGS. 1–6, with regard to the gear-change function, a common feature of each embodiment of the gear-change switches illustrated here is that by actuating the actuating element 6a, 6b, 6c the pivot spring 2a, 2b, 2c is preloaded until either the first entraining tooth 3a, 3b, 3c or the second entraining tooth 4a, 4b, 4c actively engages to the toothed wheel 12a, 12b, 12c. The entraining pin 11a, 11b, 11c is then pressed against one of the two legs of the leg spring 8a, 8b, 8c and preloads the latter in one direction as long as the actuation force exceeds the preloading force of the leg spring 8a, 8b, 8c. The toothed wheel 12a, 12b, 12c and the winding wheel 9a, 9b, 9c are rotated with the actuating element 6. Since the winding wheel 9a, 9b, 9c is connected to the fixed housing 7a, 7b, 7c via a catch spring 16a, 16b, 16c and the associated catches 15a, 15b, 15c, a higher initial torque is required to initiate the changing of the bicycle gear until the latching connection is released by the catch spring 16a, 16b, 16c being lifted out. One or more shifting steps may be produced by one actuation of the actuating element 6a, 6b, 6c depending on the amount of freedom of movement of the actuating elements 6a, 6b, 6c, which is limited using stops 22a, 22b, 22c in the fixed housing 7a, 7b, 7c. Alternatively, stops 22a, 22b, 22c may be used to block the position of the leg spring 8a, 8b, 8c in one direction of movement.

The invention is not limited by the embodiments described above which are presented as examples only but can be modified in various ways within the scope of protection defined by the appended patent claims.

We claim:

1. A gear-change switch for controlling bicycle gears, comprising:

a fixed housing having a bearing;

an actuating element having an actuating portion connected by a pivot spring to a bearing ring which is rotatably mounted on said bearing for rotation in clockwise and counterclockwise directions;

an entraining pin mounted on said actuating element;

a leg spring having two legs mounted in said fixed housing, said two legs operatively contacting said entraining pin for resiliently retaining said actuating element at a defined position;

a winding wheel connectable to a traction cable for a gear-change device fixedly connected to a toothed gear;

said winding wheel and toothed gear being rotatably mounted on said bearing;

a first entraining tooth and a second entraining tooth operatively connected to said actuating portion on opposing sides of said pivot spring such that one of said first entraining tooth and said second entraining tooth engages said toothed wheel when said actuation portion is rotated in one of the clockwise and counterclockwise directions before the entraining pin is moved.

2. The gear-change switch of claim 1, further comprising a plurality of latching teeth located on said winding wheel and a catch spring operatively connected to said fixed housing for engaging one of said plurality of latching teeth;

wherein said winding wheel is rotatable with respect to the fixed housing by at least one latching step in each of the clockwise and counterclockwise directions of actuation, the latching step being effected by the rotation of said winding wheel such that an existing engagement of said catch spring with one of said plurality of latching teeth is shifted to an engagement of said catch spring with an adjacent one of said plurality of latching teeth.

3. The gear-change switch of claim 1, further comprising stops operatively mounted in said fixed housing for limiting an amount of travel in both the clockwise and the counterclockwise directions.

4. The gear-change switch of claim 1, wherein the actuating portion, the pivot spring, the entraining pin, and the first entraining tooth and the second entraining tooth comprises one single piece of material.

5. A gear-change switch for controlling bicycle gears, comprising:

a fixed housing having a bearing;

an actuating element having an actuating portion rotatably mounted on said bearing for rotation in clockwise and counterclockwise directions;

an entraining notch mounted on said actuating element;

a switching ring fixedly connected to an entraining pin and a pivot spring and rotatably mounted about said bearing, wherein said pivot spring engages said entraining notch;

a leg spring having two legs mounted in said fixed housing, said two legs operatively contacting said entraining pin for resiliently retaining said actuating element at a defined position;

a winding wheel connectable to a traction cable for a gear-change device fixedly connected to a toothed gear;

said winding wheel and toothed gear being rotatably mounted on said bearing;

a first entraining tooth and a second entraining tooth operatively connected on opposing sides of said pivot spring such that one of said first entraining tooth and said second entraining tooth engages said toothed wheel when said actuation portion is urged in one of the clockwise and counterclockwise directions before the entraining pin is moved.

6. The gear-change switch of claim 5, further comprising a plurality of latching teeth located on said winding wheel and a catch spring operatively connected to said fixed housing for engaging one of said plurality of latching teeth;

wherein said winding wheel is rotatable with respect to the fixed housing by at least one latching step in each of the clockwise and counterclockwise directions of actuation, the latching step being effected by the rotation of said winding wheel such that an existing engagement of said catch spring with one of said plurality of latching teeth is shifted to an engagement of said catch spring with an adjacent one of said plurality of latching teeth.

7. The gear-change switch of claim 5, further comprising stops operatively mounted in said fixed housing for limiting an amount of travel of said actuating element in both the clockwise and the counterclockwise directions.

8. The gear-change switch of claim 5, wherein the switching ring, the pivot spring, the entraining teeth, and the entraining pin comprise one single piece of material.

* * * * *